US008444171B2

(12) United States Patent
Smith et al.

(10) Patent No.: US 8,444,171 B2
(45) Date of Patent: May 21, 2013

(54) CONVERTIBLE DOUBLE STROLLER

(76) Inventors: Laura Jane Smith, Toronto (CA); Ji Ke, Windsor (CA); Adam Smith, Mississauga (CA); Jason Ducharme, Toronto (CA)

( * ) Notice: Subject to any disclaimer, the term of this patent is extended or adjusted under 35 U.S.C. 154(b) by 325 days.

(21) Appl. No.: 13/007,960

(22) Filed: Jan. 17, 2011

(65) Prior Publication Data
US 2011/0175330 A1 Jul. 21, 2011

Related U.S. Application Data

(60) Provisional application No. 61/295,773, filed on Jan. 18, 2010, provisional application No. 61/373,311, filed on Aug. 13, 2010.

(51) Int. Cl.
*B62B 1/00* (2006.01)
(52) U.S. Cl.
USPC ............ 280/649; 280/642; 280/648; 280/650
(58) Field of Classification Search
USPC ...................... 280/649, 647, 642, 648, 650
See application file for complete search history.

(56) References Cited

U.S. PATENT DOCUMENTS

| 1,707,186 | A | | 3/1929 | Chatfield |
|---|---|---|---|---|
| 3,223,431 | A | * | 12/1965 | Gottfried et al. ........... 280/47.38 |
| 4,805,938 | A | | 2/1989 | Redmond et al. |
| 4,969,656 | A | | 11/1990 | Clausen |
| 5,522,121 | A | | 6/1996 | Fraynd et al. |
| 5,653,460 | A | * | 8/1997 | Fogarty ........................ 280/642 |
| 6,086,087 | A | | 7/2000 | Yang |
| 6,209,892 | B1 | * | 4/2001 | Schaaf et al. ................. 280/642 |
| 6,530,591 | B2 | | 3/2003 | Huang |
| 6,550,802 | B2 | * | 4/2003 | Sheehan ........................ 280/647 |
| 6,585,284 | B2 | | 7/2003 | Sweeney et al. |
| 6,752,405 | B1 | * | 6/2004 | Wright .......................... 280/642 |
| 7,475,900 | B2 | * | 1/2009 | Cheng ........................... 280/642 |
| 7,481,439 | B2 | * | 1/2009 | Thompson ..................... 280/408 |
| 7,516,966 | B2 | * | 4/2009 | Gray ............................. 280/649 |

(Continued)

FOREIGN PATENT DOCUMENTS

GB 2431140 A 4/2007
WO 2010116215 A1 10/2010

OTHER PUBLICATIONS

International Search Report for PCT/CA2011/050499, Oct. 25, 2011, 3 pages, ISA.

*Primary Examiner* — J. Allen Shriver, II
*Assistant Examiner* — James M Dolak
(74) *Attorney, Agent, or Firm* — LifeCycle IP Management Inc.

(57) ABSTRACT

A convertible double stroller comprising a pair of cross bars pivotally connected at a common vertex connected to a pair of telescoping rods creating a generally hour-glass shaped frame assembly having a front end and a rear end, a plurality of wheels attached to the frame assembly, a handle bar attached to the frame assembly rear end, and a pair of seat mounts fixedly attached to each of the telescoping rods, wherein the convertible double stroller may be selectively transitioned between three configurations: (a) a seated configuration wherein the frame assembly is in a fully expanded position thereby positioning the seat mounts in a side-by-side placement for seating; (b) a seated configuration wherein the frame assembly is in a moderately expanded position thereby positioning the seat mounts in a front-to-rear placement for seating; and (c) a storage configuration wherein the frame assembly is in a fully collapsed position for storage.

20 Claims, 10 Drawing Sheets

U.S. PATENT DOCUMENTS

| | | | |
|---|---|---|---|
| D598,333 S * | 8/2009 | Li et al. | D12/129 |
| 8,128,103 B1 * | 3/2012 | Schutzendorf et al. | 280/648 |
| 8,157,273 B2 * | 4/2012 | Bar-Lev | 280/648 |
| 8,220,822 B2 * | 7/2012 | Cohen et al. | 280/647 |
| 8,282,119 B1 * | 10/2012 | Caksa | 280/642 |
| 2002/0070531 A1 | 6/2002 | Sheehan | |

* cited by examiner

CONVERTIBLE DOUBLE STROLLER

This application claims priority of U.S. Provisional Patent Application of Laura Jane Smith, Jason Max Ducharme, Adam Clayton Smith, and Ji Ke, Ser. No. 61/295,773 for Convertible Base Mechanism for Stroller, filed Jan. 18, 2010, and U.S. Provisional Patent Application of Laura Jane Smith, Jason Max Ducharme, Adam Clayton Smith, and Ji Ke, Ser. No. 61/373,311 for Convertible base for stroller using crossbar scissor mechanism, filed Aug. 13, 2010.

BACKGROUND OF THE INVENTION

The present disclosure relates generally to children's strollers and, more specifically, to a double stroller having two seats and a convertible frame assembly that positions the seats in either a side-by-side or tandem (front-to-back) arrangement.

Often times caregivers of children need to transport two children in a stroller or baby carriage. There are carriage devices designed for infants and toddlers which are designed to carry two children. Movement of the double side-by-side stroller from place to place can be difficult because of the width of the wheelbase. In addition, if the stroller is configured in a tandem arrangement the child in the back seat is not seated in a position to observe the environment over the child in the front seat. The problem with existing double strollers is the inability to easily fit through a multiplicity of different sized doors or narrow confines and the inability to easily change from a side-by-side to a front-to-back arrangement.

There are many examples of carriages in the industry. For instance, U.S. Pat. No. 1,707,186 discloses a double carriage having extendable axles for supporting the carriages and an extendable handle for connection with the carriage when the axle is in the extended position. The problem with this design is that the seats are in a fixed position and the extendable axles only allow for a wider wheelbase but not a narrower wheelbase. Therefore there is no ability to navigate through narrow spaces.

U.K. Patent No. 2,152,447 describes a pushchair with a reclinable backrest, characterized by the fact that it comprises a frame, a seat having the backrest supported on a first structure connected to the frame, a base, two side walls supported on a second structure hinged to the first structure in such a manner as to adjust the angle of the latter in relation to the second structure, and a body for each of the side walls for connecting the backrest to the respective side wall. The problem with this device is that it is a single unit stroller and possesses no capacity for carrying more than one infant.

U.S. Pat. No. 4,805,938 discloses a device for connecting two baby strollers together consisting of a pair of bracket units spaced apart and clamped between frames of the baby strollers so that one person can operate the strollers simultaneously for transporting two babies therein. The problem with this design is that it is cumbersome to store and carry when it is not attached and it is time-consuming to attach the device to two separate strollers. It is also difficult to attach because existing strollers are not manufactured in a uniform size and shape. An additional problem is that the only configuration possible with this connecting device is a side-by-side design.

U.S. Pat. No. 4,969,656 discloses a stroller that has a series of seats at cut-out areas in a tray supported on columns secured to a wheeled floor panel. This wagon type configuration allows for additional seats to be added by hitching another wagon to the end of the device. Although the configuration allows the occupants of the device to be seated front-to-back it has no capacity to be folded and stored away, nor does it have the capacity allow the occupants to be seated side-by-side.

Another coupler to join two strollers is disclosed in U.S. Pat. No. 5,522,121 which describes a snap release connector device for engaging and disengaging two strollers. The snap release connector can rotate at any angle which allows one person to operate the two strolling devices simultaneously. Again the problem with this design is that it is cumbersome to store and carry when it is not attached and it is time-consuming to attach the device to two separate strollers.

U.S. Pat. No. 6,086,087 discloses a front-to-back stroller having a non-detachable seat and a detachable seat. When the detachable seat is removed the non-detachable seat uses the space to allow occupants to be seated in different reclining positions. The problem with this design is that the only configuration possible is a front-to-back stroller design.

In U.S. Pat. No. 6,530,591 a frame structure for a baby stroller is disclosed that is constructed to include a seat for a first child and a rear seat frame bar that supports a footplate which allows a second child to stand behind the seat and inside the handle. The problem with this design is that it does not allow for the child behind the seat to also be seated in addition to not providing for a side-by-side seating arrangement.

U.S. Pat. No. 6,585,284 discloses a height adjustable rear seat for a tandem stroller where the seat height is adjusted by physically moving the seat platform connected to the handle uprights. This design suffers a number of drawbacks, such as the seat could fall while an infant was seated within the seat thereby injuring the child. Moreover, this design precludes the stroller from folding into a compact arrangement for easy transport and storage as well as the fact that it is impossible to convert the tandem stroller to a side-by-side stroller using the disclosed feature.

A significant deficiency with the previous developed stroller solutions, as well as many other similar devices, is that they do not provide for a stroller that is easily changed from a side-by-side to a front-to-back arrangement. Devices that are currently in the industry provide for double strollers with seat positioning to be either in a side-by-side arrangement or in a tandem arrangement.

Therefore, it can be seen that there is a long-felt need for a stroller which can quickly and easily convert from a side-by-side stroller to a tandem (or front-to-rear) stroller. The present invention satisfies the above-mentioned needs, as well as others, and overcomes the deficiencies in devices heretofore developed.

SUMMARY OF THE INVENTION

The present disclosure generally comprises a double stroller having a convertible frame assembly that includes a cross bar frame assembly which can be expanded or collapsed in a scissor-motion to allow the seat mounts to be oriented in either a side-by-side placement or in a tandem (front and back) seat placement.

A primary object of the present disclosure is to provide a double stroller having a convertible frame assembly that accommodates seats that can be positioned in either a side-by-side or tandem configuration.

Another object of the present disclosure is to provide a double stroller having a convertible frame assembly that can be easily converted from tandem to side-by-side without first requiring the removal of the seats from their respective seat mounts.

A further object of the present disclosure is to provide a double stroller having a convertible frame assembly that can accommodate seat mounts configured to support many types of seats or other carrying devices such as bassinets, car seats, pet carriers, coolers, tubs, and baskets, or any combination of the same.

An additional object of the present disclosure is to provide a double stroller having a convertible frame assembly that utilizes an adjustable rear wheel elevating device to elevate the rear seat such that a child in the rear seat can have an unobstructed view over the top of the front seat in the tandem position.

Still another object of the present disclosure is provide a double stroller having a convertible frame assembly that is easy to reposition and fold, is readily storable and is made of a lightweight material that easy to manufacture.

A further object of the present disclosure is to provide a double stroller having a convertible frame assembly having handlebars that are adjustable in height and are further rotatable on a handle post as well as facilitating the stroller when fully collapsed for storage.

Another object of the present disclosure is to provide a convertible frame assembly for a double stroller having a locking mechanism which releases the wheels to permit the conversion scissor-motion to occur and locks the stroller in its tandem or side-by-side or fully collapsed positions.

The above and other objects are accomplished in accordance with the present disclosure which comprises convertible double stroller comprising a pair of cross bars pivotally connected at a common vertex connected to a pair of telescoping rods creating a generally hour-glass shaped frame assembly having a front end and a rear end, a plurality of wheels attached to the frame assembly, a handle bar attached to the frame assembly rear end, and a pair of seat mounts fixedly attached to each of the telescoping rods, wherein the convertible double stroller may be selectively transitioned between three configurations: (a) a seated configuration wherein the frame assembly is in a fully expanded position thereby positioning the seat mounts in a side-by-side placement for seating; (b) a seated configuration wherein the frame assembly is in an intermediately expanded position thereby positioning the seat mounts in a front-to-rear placement for seating; and (c) a storage configuration wherein the frame assembly is in a fully collapsed position for storage.

These and other objects, features and advantages of the present disclosure will become readily apparent to those having ordinary skill in the art upon a reading of the following detailed description in view of the appended claims and drawings.

DESCRIPTION OF THE DRAWINGS

The present disclosure and the manner in which it may be practiced is further illustrated with reference to the accompanying drawings wherein.

DETAILED DESCRIPTION OF THE INVENTION

Figure 1:
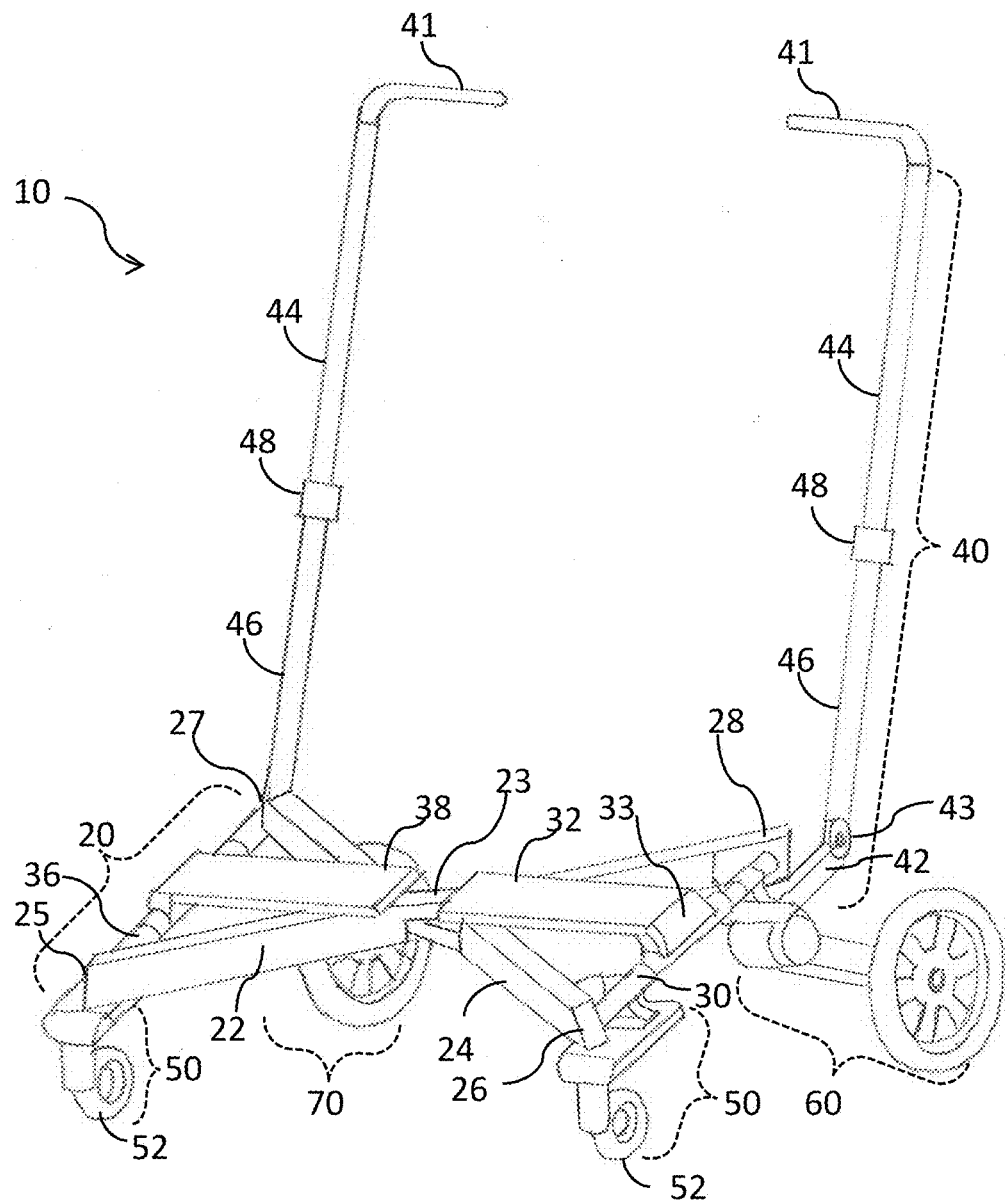
FIG. 1 shows a perspective view of one embodiment of the present disclosure where the fully assembled convertible frame assembly is in the side-by-side orientation without seats or other carrying devices added to the base frame assembly.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

Caregivers of children need to transport two children in a stroller or baby carriage. There are carriage devices designed for infants and toddlers which are designed to carry two children. The present disclosure generally comprises a convertible frame assembly for a double stroller that includes a cross bar base frame assembly which can be expanded or collapsed in a scissor-motion to allow the seat mounts to be oriented in either a side-by-side placement or in a tandem (front and back) seat placement.

A side-by-side seating arrangement allows two children to have an equally enjoyable view and to easily interact with each other; however, the disadvantage of side-by-side seat arrangement is that the stroller is very wide and can be difficult to maneuver through narrow openings such as doors, hallways, store aisles, escalators, elevators, etc. The advantage of strollers that have seats positioned in tandem arrangement is that they are narrower so that the stroller can be maneuvered through more inaccessible spaces; however the seating is such that one child in the rear has an obstructed view and cannot easily interact with the child in the front seat.

The unique feature of the present disclosure is that the seating arrangement can be easily converted from tandem to side-by-side and vice versa, depending on which position is most useful and desirable at any one moment. The device of the present disclosure solves the problem of having to choose between either a tandem or side-by-side double stroller, both of which have disadvantages. The present disclosure provides an easily convertible frame assembly whereby stroller owners can benefit from having both a side-by-side and a tandem stroller in one single, simple convertible stroller base frame assembly.

The following discussion describes, in detail, various embodiments of a convertible frame assembly for a double stroller of the present disclosure. This discussion should not be construed, however, as limiting the disclosure to those particular embodiments since practitioners skilled in the art will recognize numerous other embodiments as well. The following detailed description is, therefore, not to be taken in a limiting sense, and the scope of the present disclosure is best defined by the appended claims. For example, an object of the stroller is to have the ability to convert from a side-by-side configuration to a tandem configuration. In the present disclosure this object is achieved through use of a cross-bar assembly which permits a scissor-motion conversion; however, there are other possible mechanisms such as a swivel, slide, crank, latch, spring-load, or weight motion that could be used to achieve the desired objective.

In the description, reference is made to the accompanying drawings, which form a part hereof, and in which is shown by way of illustration specific embodiments in which the disclosure may be practiced. These embodiments will be described in sufficient detail to enable those skilled in the art to practice the invention, and it is to be understood that other embodiments may be utilized and that structural changes may be made without departing from the scope of the invention. Although the embodiments of the disclosure are described as having two seats with an elevated rear seat when in a tandem configuration, the present disclosure is not necessarily limited to this configuration; other configurations can include three or more seats, as well as without the optional rear elevation feature.

Turning now to the drawings, an exemplary of a convertible frame assembly for a double stroller is generally depicted in FIGS. 1 through 7 by the numeral 10 and is constructed in accordance with the teachings of the present disclosure. In this example, the stroller generally has a frame assembly 20 having a seat mount assembly 32 and 38 supported by the frame assembly, and a plurality of wheels supporting the frame assembly on a ground surface. The frame assembly and seat mount assembly are constructed using any suitable material such as aluminum, steel, or a rigid plastic. In this example, each front wheel assembly 50 has at least one wheel 52 attached thereto. Preferably, each front wheel assembly is free to rotate 360 degrees. Stroller 10 is equipped with two single rear wheel assemblies 60 and 70 which are shown in greater detail in FIGS. 8 through 10. Each of the front and rear wheels is constructed of a rigid plastic or rubber. Each wheel can be of solid construction or can be an inflatable tire. Stroller 10 is maneuvered by the user through use of handle assembly 40.

As shown in FIG. 1, an embodiment of the present disclosure consists of frame assembly 20 which is composed of two cross bars 22 and 24 that are connected together via pivot pin 23 at the intersection of the two bars to create generally x-shaped cross bars that pivot around pivot joint 23. In a preferred embodiment, cross bars 22 and 24 are curved in a generally s-shaped curve in order to facilitate a full collapsing of the frame assembly for storage. With curved cross bars 22 and 24, the convertible double stroller 10 may be selectively transitioned between three configurations: a fully expanded configuration thereby creating a seated configuration wherein seat mounts (described below) are in a side-by-side placement; an intermediately expanded configuration thereby creating a seated configuration wherein seat mounts (described below) are in a front-to-rear placement; and a fully collapsed configuration wherein the seat plates are in a front-to-rear placement suitable for storage. The cross bars 22 and 24 included in the frame assembly 20 comprise a pair of front ends, a first cross bar end 25 and a second cross bar end 26, and a pair of back ends, a third crossbar end 27 and a fourth crossbar end 28. Cross bars 22 and 24 interconnect with each other through a pivot joint 23 defining a pivot axis wherein the pivot axis changes angle 80, which is formed by the intersecting of the cross bars, as the positions of the cross bars are manipulated during adjustment of the stroller configuration. Pivot joint 23 is, for example, a fastener such as a connection pin located intermediate the ends of the interconnecting cross bars 22 and 24. The cross bar ends 25, 26, 27 and 28 are identical with each other, but are given different reference numbers herein to facilitate understanding of their interaction with each other. Respective telescoping rods 30 and 36 are pivotally attached to the crossbar ends and extend generally perpendicularly away from the plane created by the front wheels and the plane created by the rear wheels, and extend parallel with one another. Telescoping rods 30 and 36 are comprised of at least two subunits wherein at least one subunit is slidably secured within a stationary subunit. The telescoping rods 30 and 36 are oriented such that the stationary subunit of one telescoping rod 30 or 36 is secured to a front cross bar end 25 or 26, respectively, while the stationary subunit of the opposing telescoping rod 30 or 36 is secured to a rear cross bar end 27 or 28, respectively.

Figure 2:
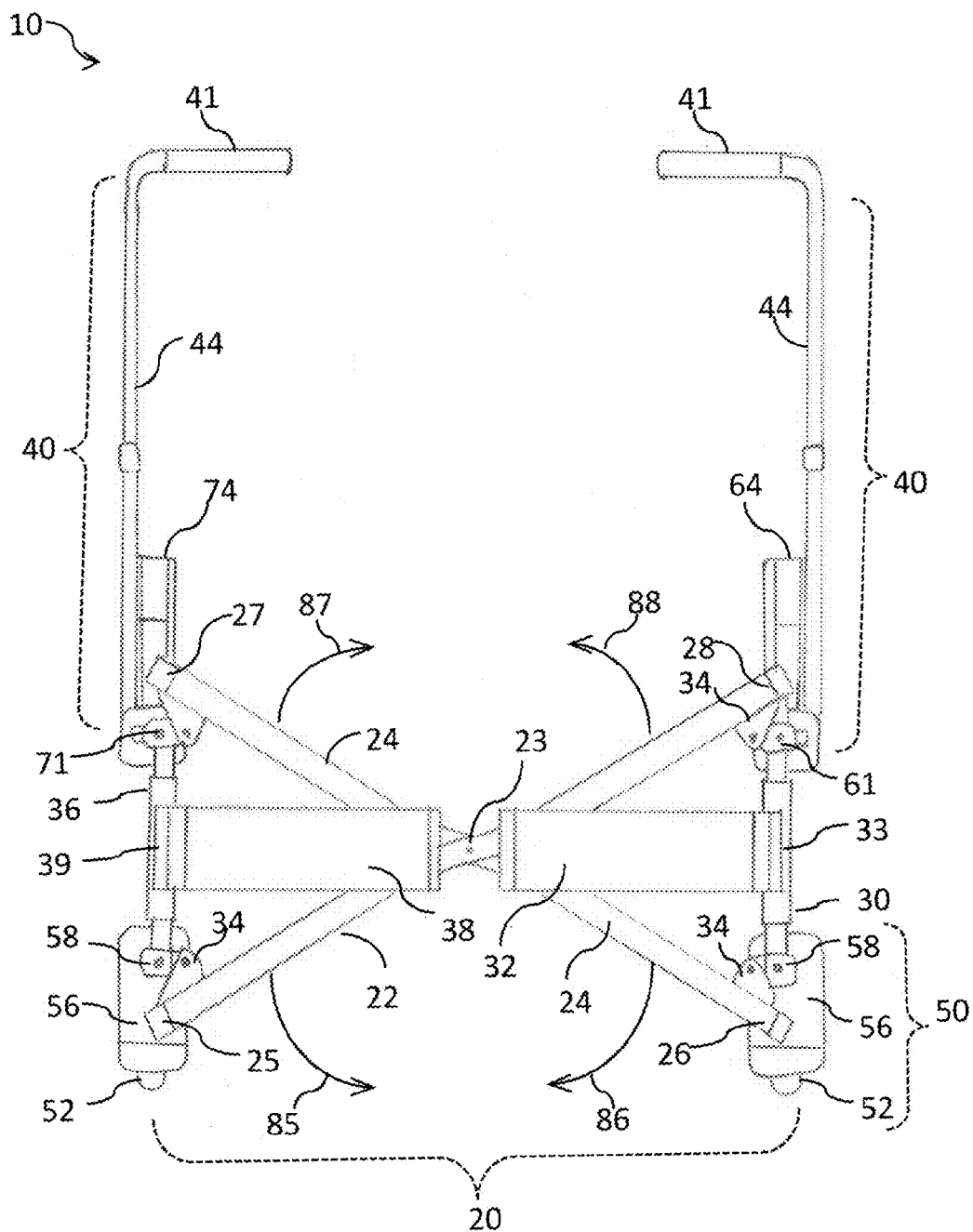
FIG. 2 shows a top view of one embodiment of the present disclosure where the fully assembled convertible frame assembly is in the side-by-side orientation without seats or other carrying devices added to the base frame assembly.
Figure 3:
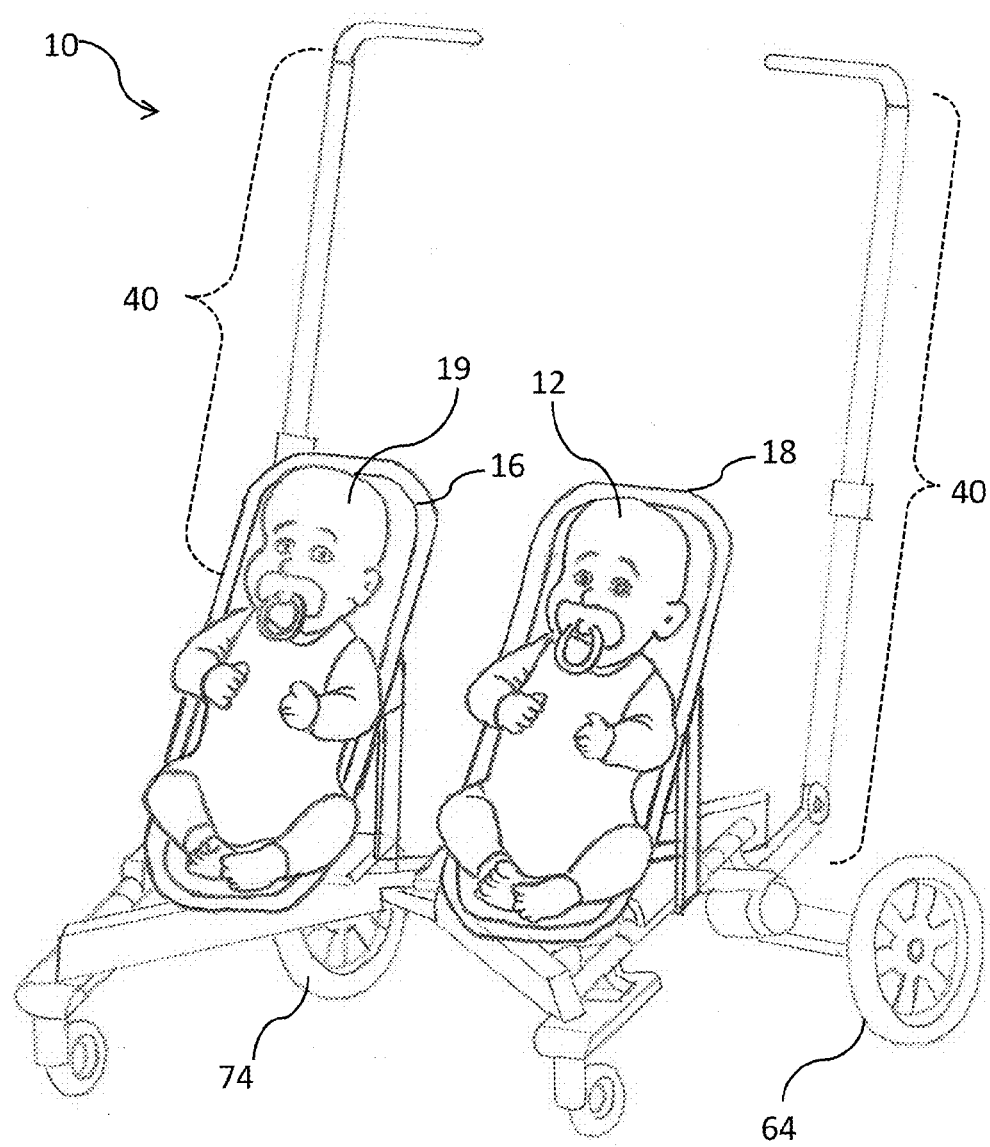
FIG. 3 shows a perspective view of one embodiment of the present disclosure where the fully assembled convertible frame assembly is in the side-by-side orientation with seats containing children.
Figure 4:
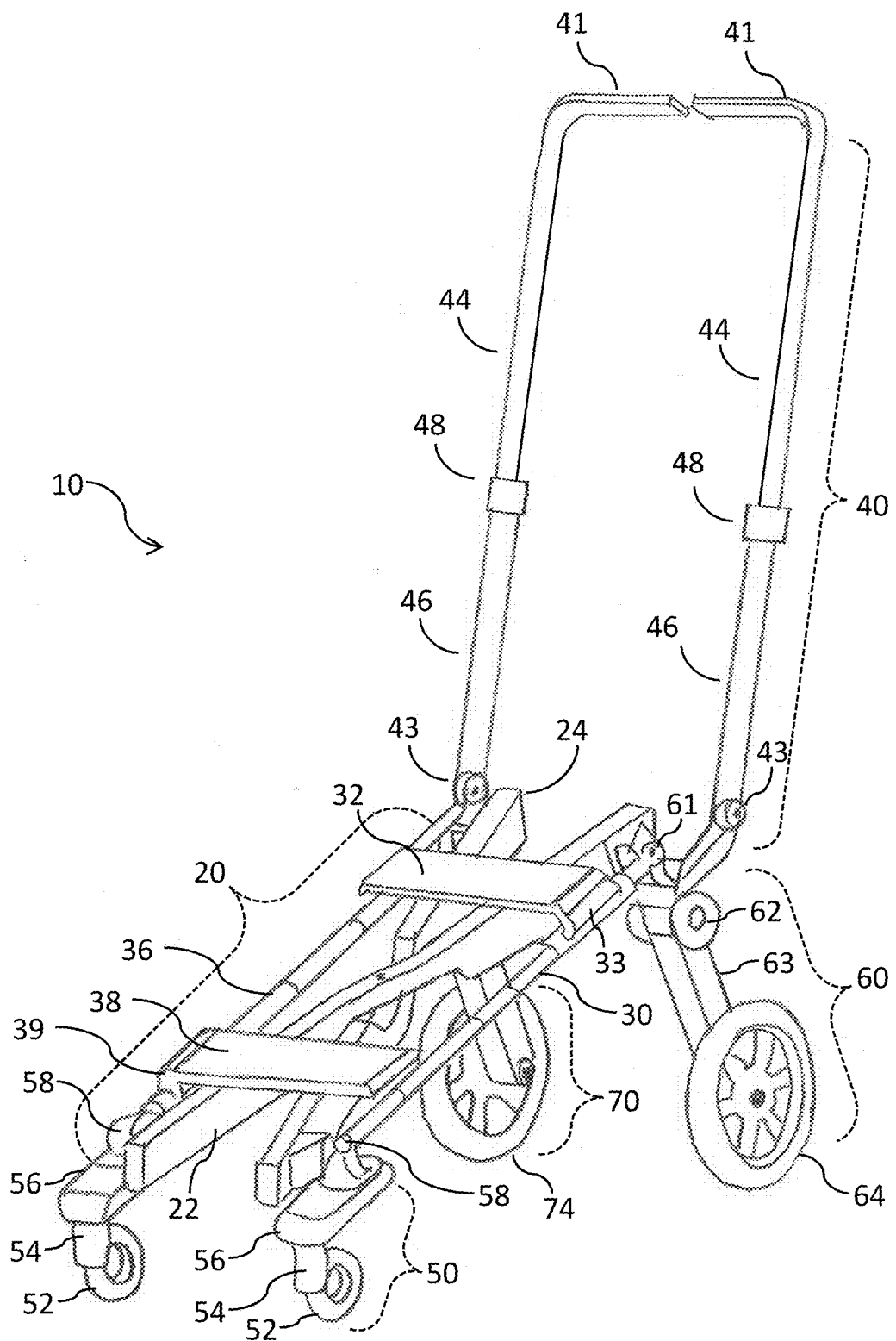
FIG. 4 shows a perspective view of one embodiment of the present disclosure where the fully assembled convertible frame assembly is in the tandem orientation without seats or other carrying devices added to the base frame assembly.
Figure 5:
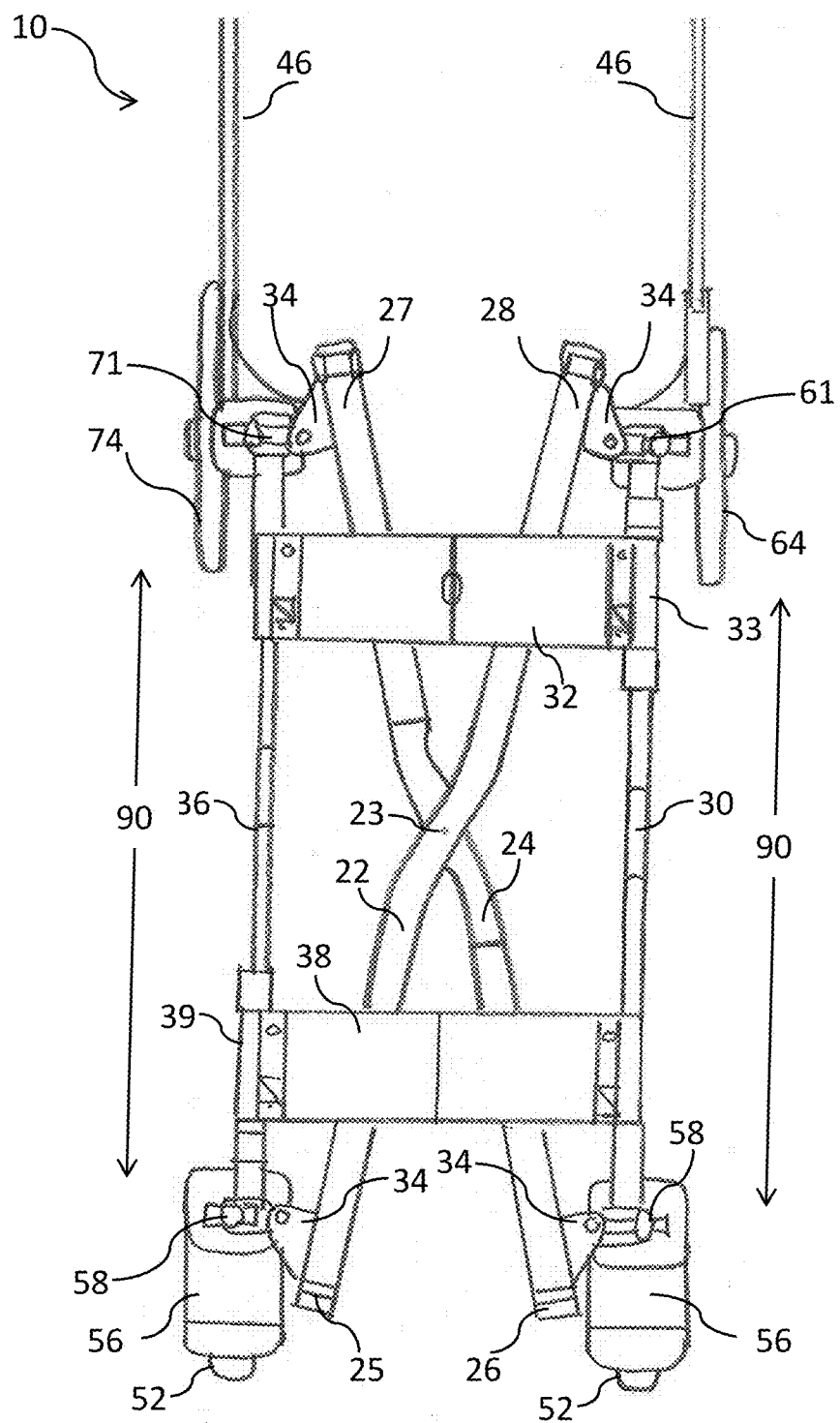
FIG. 5 shows a top view of one embodiment of the present disclosure where the fully assembled convertible frame assembly is in the tandem orientation without seats or other carrying devices added to the base frame assembly.
Figure 6:
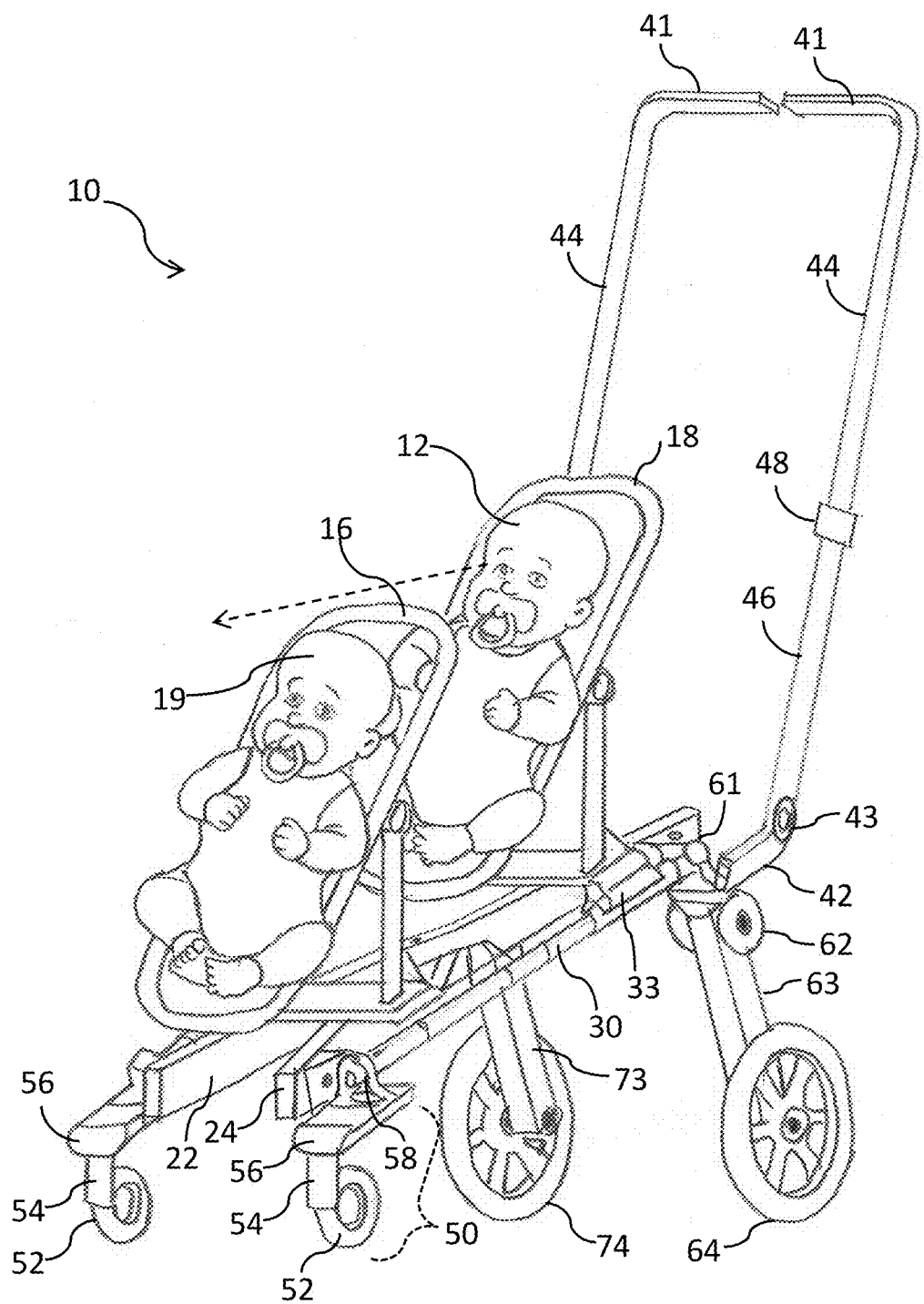
FIG. 6 shows a perspective view of one embodiment of the present disclosure where the fully assembled convertible frame assembly is in the tandem orientation with seats containing children. The dashed arrow illustrates the sightline for the child in the rear seat position.
Figure 7:
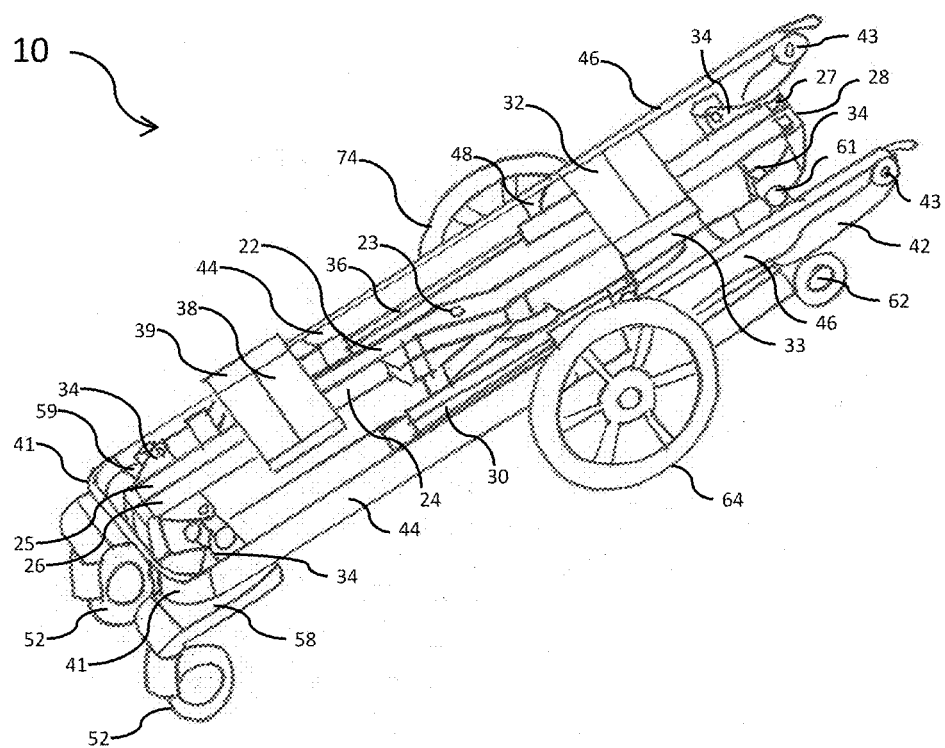
FIG. 7 shows a perspective view of one embodiment of the present disclosure where the fully assembled convertible frame assembly is in the compact, folded position.

As shown in FIGS. 1, 2 and 3, one orientation of the convertible frame assembly places the stroller seats in a fully expanded, side-by-side configuration. FIGS. 4, 5 and 6 show the convertible frame assembly with the seats in an intermediately expanded, tandem orientation. FIG. 7 shows the convertible frame assembly in a fully collapsed configuration for storage. In the side-by-side orientation, cross bars 22 and 24, along with telescoping rods 30 and 36 form a generally hourglass shaped configuration comprising two generally equilateral triangles connected at the common vertex of pivot joint 23. In the side-by-side configuration, the convertible frame assembly has a pivot axis angle 80 greater than ninety degrees and the telescoping rods 30 and 36 are in the collapsed position (as shown by arrows 95). When converting the stroller into an intermediately expanded, tandem orientation (as shown in FIG. 5), the angle of pivot axis angle 80 is reduced to less than ninety degrees by pivoting cross bar ends 25, 26, 27 and 28 as shown by arrows 85, 86, 87 and 88, respectively, about pivot joint 23 thereby extending telescoping rods 30 and 36, as shown by arrow 90 (as shown in FIG. 5), while cross bars 22 and 24 do not change in length. From this intermediate tandem position the frame can be either expanded to form a side-by-side configuration, or collapsed for storage. When in the fully collapsed orientation (as shown in FIG. 7), the pivot axis angle is reduced such that cross bars 22 and 24 are roughly parallel with one another.

Each of the telescoping rods 30 and 36 is connected to the corner of the crossbar mechanism by a pivoting hinge 34 which permits the telescoping rods to remain in a forward to backward orientation irrespective of whether the frame assembly is in a collapsed or expanded position. The telescoping rods 30 and 36 are further configured to secure seat plates 32 and 38, respectively. Each seat plate is securely affixed to a telescoping rod at one end via seat plate mounts 33 and 39, respectively while the other end of each seat plate floats unfastened. Each seat plate mount 33 and 39 is securely affixed to the stationary subunit of the telescoping rods 30 and 36, respectively. In use, each unfastened, floating end is positioned such that it is aligned to be supported by a portion of frame assembly 20—the pivot joint when in the side-by-side configuration (as shown in FIG. 2), and the opposing telescoping rod in the tandem configuration (as shown in FIG. 5). Since the telescoping rods are always in a forward to backward orientation, irrespective of the position of the x-shaped cross bars, the seat plates (and, in one embodiment, the child seats that are attached to the seat plates) will also always be in a forward orientation.

By attaching the seat plates 32 and 38 directly to the telescoping rods 30 and 36, respectively, the seat plates are allowed to move freely and independently of the x-shaped cross bars. Securing the seat plate mounts 33 and 39 to the stationary subunits of telescoping rods 30 and 36, respectively, permits the seat plate mounts to move from a side-by-side orientation to a tandem orientation without obstruction or the need to remove the seat plates from the telescoping rods. Independent motion permits a smooth conversion from side-by-side to tandem seat arrangement without having to remove or adjust the seats to maintain a forward orientation. The seats always face forward due to the unique base frame assembly that combines x-shaped cross bars that can expand and collapse, combined with telescoping rods on each side that maintain the seats in a forward orientation at all times. It is envisioned in a particular embodiment of the present disclosure that removal of the seats affixed to the seat mounts is unnecessary as the x-shaped cross bars are moved from a side-by-side to a tandem orientation. More preferably, it is further envisioned that removal of the children seated in the mounted seats is unnecessary during the conversion process.

As shown in FIG. 4, seat plate mount 33 is securely affixed to telescoping rod 30 such that the stationary end of telescoping rod 30 is secured to right rear mounting bracket 61. Seat plate mount 39 is securely affixed to telescoping rod 36 such that the stationary end of telescoping rod 36 is secured to left front mounting bracket 58. This arrangement places seat plate 32 in the rear position and seat plate 38 in the front position when the stroller is in the tandem orientation. Although shown and described in this manner, it is envisioned that the seat mount plates are securely affixed to the alternative telescoping rod (i.e. seat plate mount 33 is secured to telescoping rod 36 while seat plate mount 39 is secured to telescoping rod 30).

The seat plates 32 and 38 are configured for compatibility with a variety of seat assemblies or other seating components. For example a car seat carrier may be engaged to the seat mounts to accommodate an infant child occupant. It is envisioned that seat plates 32 and 38 can further be used to mount additional carrying devices such as, but not limited to, bassinettes, pet carriers, as well as coolers, baskets, tubs, and the like. The seat plate is purposefully designed to be flexible in order to accommodate a wide range of seat designs. This ensures that the stroller base frame assembly is compatible with the widest possible range of seat manufacturer specifications. A further advantage of this design is that users can alter the utility of the stroller over time to suit the natural growth and changing needs of young parents. With one child, the stroller base assembly can be used with a child seat and any other storage container. Once a family has two children the base assembly can be used with a variety of configurations including two seats, seat plus car seat, seat plus carriage, two carriages, etc. Moreover, the seat plate mechanism is designed to be foldable once the seat has been removed. This permits the stroller frame assembly to be fully collapsed into a highly compact configuration for storage, as illustrated in FIG. 7.

Turning now to the handle assembly 40, the base 42 of each handle is attached to the rear-oriented ends 27 and 28 of the stroller frame assembly 20, adjacent to the rear wheel mounts. In one embodiment, the right and left handles move independently to ensure that the handles can be close together when the stroller is in a tandem seat arrangement, and further apart when the stroller is in a side-by-side seat arrangement. Although shown as having handles 41, any suitable gripping mechanism can be used, such as but not limited to posts with or without grips, handles, or a handle bar. Indeed, in an alternative embodiment, the non-attached ends of the left and right handles are connected by a horizontal telescopic bar to form a single handlebar unit. The telescopic bar allows the handlebar to collapse and extend as the stroller converts from either a side-by-side stroller or tandem stroller to the other. Handles 41 can additionally be equipped with a swivel mechanism to permit the handles to freely rotate their position, i.e. facing inward, outward, toward, or away from the user.

Handle assembly 40 is attached to the stroller base assembly through a locking hinge mechanism 43. The locking hinge mechanism 43, when disengaged, allows the handles to be positioned in a forward direction when the stroller is collapsed for storage. The location of handles in a fully collapsed configuration is best illustrated in FIG. 7. In a preferred embodiment, each handle is constructed to be height adjustable by way of two segments 44 and 46 that permit the handle height to be adjusted up or down to suit the user's preference and comfort with a locking mechanism 48 located on each handle to secure the handle height at any desired position.

Included at the base of each handle is a locking switch mechanism that is used to enable the stroller conversion process. The locking mechanism ensures that the x-shaped cross bars can only lock into one of three possible positions: fully expanded for a side-by-side orientation; partially expanded for a tandem seat orientation; or fully collapsed for storage. Preferably, in one embodiment, the convertible frame assembly is unlocked as the user depresses a switch located at the base of the handle. The switch releases the x-shaped cross bars to allow the generally s-shaped curved bars 22 and 24 to open and close. The user then moves the x-shaped cross bars into the desired position where it will be once again be locked for security.

Front wheels are mounted onto the two forward-facing ends 25 and 26 of the telescoping rods 22 and 24 by way of front wheel mounting brackets 58 as shown most clearly in FIG. 4. Wheel mounting brackets 58 house front wheels 52 by way of posts 54 and wheel plates 56. The wheel mounts 50 are designed to allow the front wheels 52 to swivel in a 360 degree fashion to ensure that that the wheels always maintain a forward orientation when the stroller is in either a side by side or tandem arrangements. In a preferred embodiment, the front wheels are designed to maintain a constant angle of twenty degrees between the stroller frame and the ground, irrespective of whether that stroller is in the side-by-side or tandem configuration. The twenty degrees ensure that the rear seat will always be higher than the front seat when the convertible frame assembly is configured in the tandem orientation.

Figure 8:
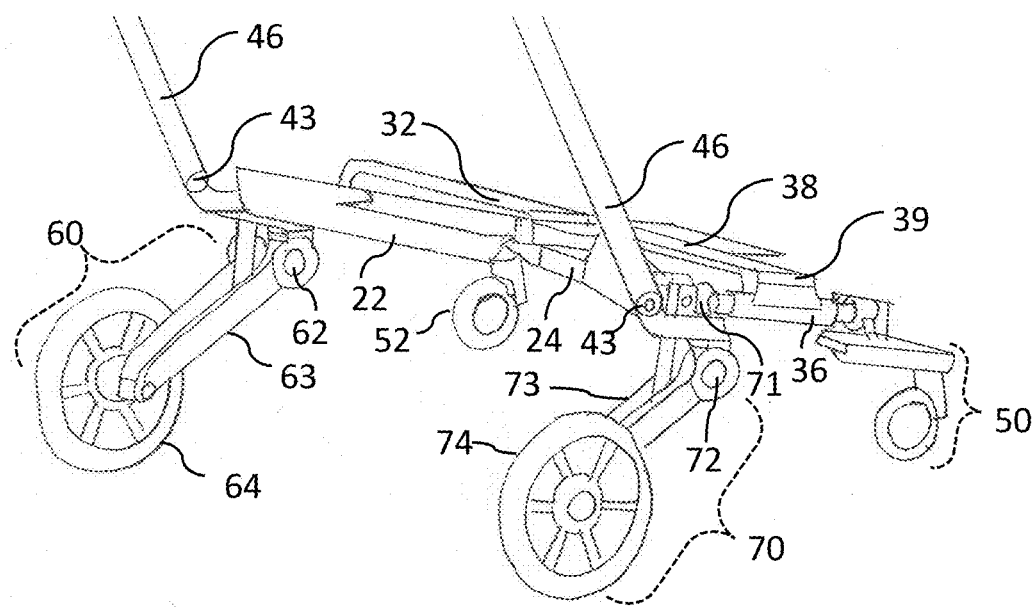
FIG. 8 shows a close-up view of one embodiment of the rear wheels of the present disclosure where the rear wheels are in the "down" position.
Figure 9:
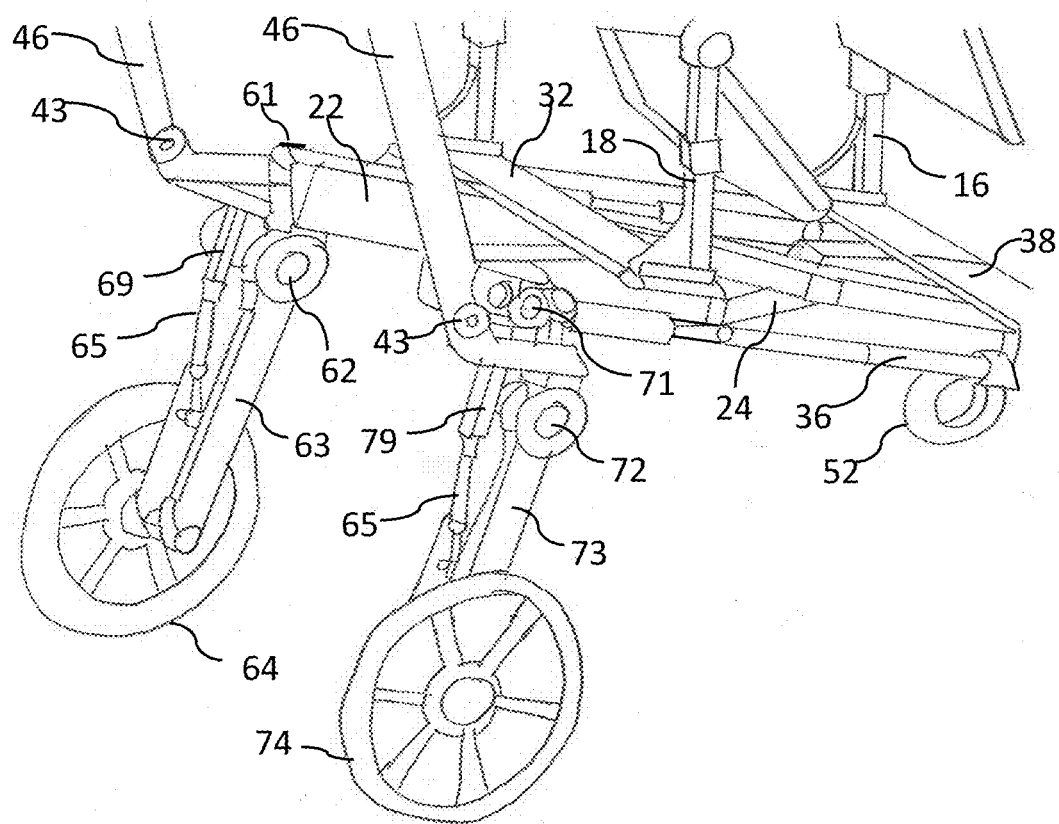
FIG. 9 shows a close-up view of one embodiment of the rear wheels of the present disclosure where the rear wheels are in the "up" position.
Figure 10:
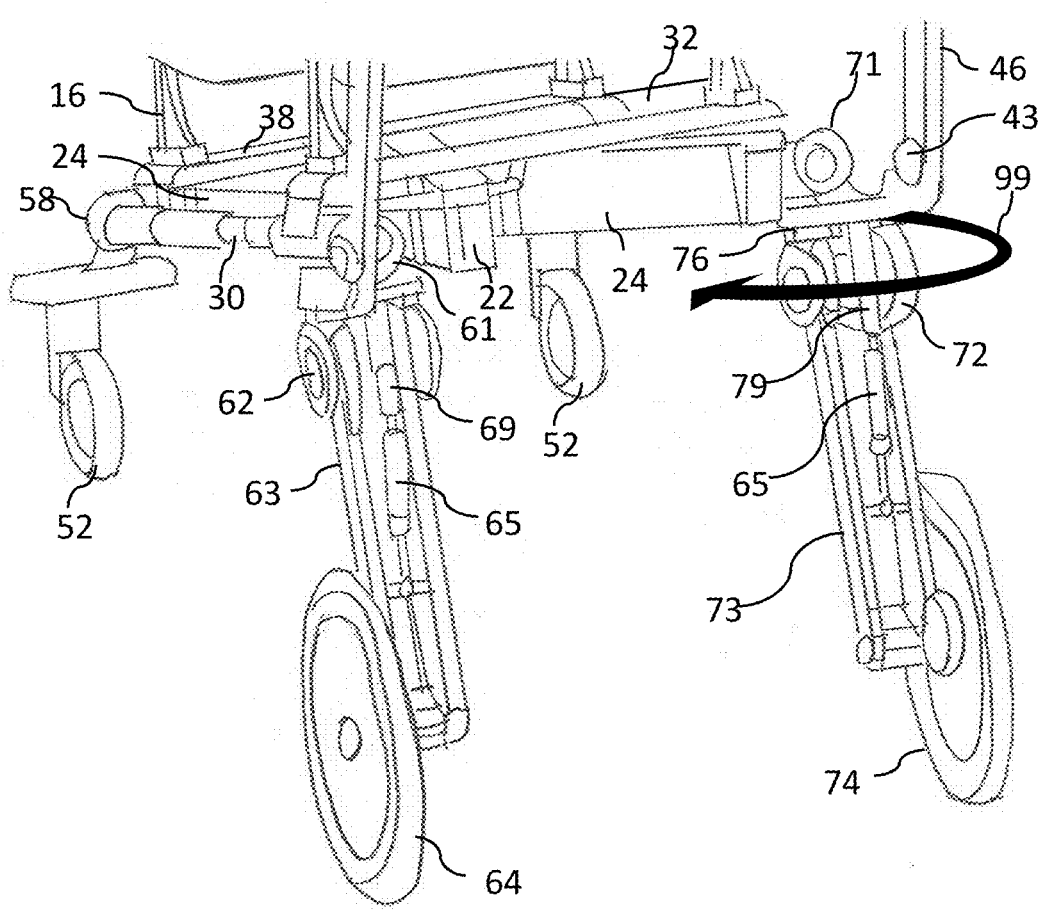
FIG. 10 shows a close-up view of one embodiment of a rear wheel of the present disclosure showing the pivot bearing of the wheel mount.

In a preferred embodiment of the present disclosure, the stroller 10 has at least two rear wheel assemblies 60 and 70 which are shown in greater detail in FIGS. 8 through 10. Rear wheel assemblies 60 and 70 are fastened to the stroller frame assembly 20 using mounting brackets 61 and 71, respectively. Right wheel pivot hinge 62 connects right wheel mounting bracket 61 to right wheel post 63. At least one wheel 64 is mounted onto right wheel post 63. Wheel 64 can be constructed to be a solid wheel or can be pneumatically inflated.

Left rear wheel assembly 70 is constructed in an identical manner as right rear wheel assembly 60 except for the addition of swivel mechanism 76 located between mounting bracket 71 and wheel post 73.

As shown more clearly in FIG. 10, swivel mechanism 76 allows the left rear wheel post 73 (and rear wheel 74) to rotate approximately 90 degrees outwardly as shown by 99 (in the case of the left rear wheel this would be in a clockwise direction). In a particular embodiment, swivel mechanism 76 is equipped with locking mechanism which prevents the rear wheel from swiveling when the stroller is in use, but unlocks the mechanism to aid in converting the stroller from a side-by-side orientation to a tandem orientation, and vice-versa. When switching the stroller between a side-by-side orientation and a tandem orientation, the locking mechanism is released thereby allowing wheel 74 to rotate approximately 90. Once rotated, wheel 74 is locked in this position by securing the locking mechanism. Left rear wheel 74 freely rolls as the x-shaped cross bars open or close horizontally until the desired stroller mode is achieved. When the desired position is reached, left rear wheel is then unlocked again and rotated back into its original position. Once in its original position, left rear wheel 74 is prevented from swiveling by the locking mechanism, thereby securing the stroller in the desired mode. In a preferred embodiment of the present disclosure, swivel mechanism 76 is a ball bearing joint, although it is envisioned that any suitable system may be used. Although described as having a swiveling left rear wheel, it is envisioned that the stroller can be alternatively constructed to have a swiveling right rear wheel.

As most clearly shown in FIG. 9, a rear strut/gas spring mechanism 65 is attached to each rear wheel post 63 and 73 and stroller frame assembly 20 to assist the rear wheels in achieving a difference in seat height between the tandem and side-by-side stages. As shown in FIG. 8, when in the side-by-side stage, the gas springs rear struts (not shown) are compressed allowing both seats 16 and 18 (as shown in FIG. 3) to be oriented at the same height above ground. Thus, as shown in FIG. 3, each child 12 and child 19 is at the same height above ground as has an unobstructed forward view.

FIG. 9 depicts the convertable double stroller of the current disclosure in the tandem seat configuration, the gas springs rear struts 65 are extended which elevates the rear of the stroller. FIG. 6 shows how elevating the rear of the stroller raises the rear seat 18 such that the child 12 in the rear seat 18 can see over the child 19 in front seat 16 as shown by the dashed arrow. During the conversion process, a locking mechanism 69 and 79 ensures the right rear wheel 64 and left rear wheel 74, respectively, will click and lock into place at the desired height. The locking mechanism 69 and 79 prevents any unplanned change to seat heights during use. Additionally, in a preferred embodiment of the stroller, the height of each rear wheel can be adjusted to maintain an approximate 20 degree angle between the front and rear wheels.

Although described as having a gas spring rear strut as the method of enabling elevation differences between the front and rear wheel, the present invention is not necessarily limited to the use of gas springs rear struts: other energy storage/release devices such as coil springs or pneumatic springs can be used, as well as mechanical means such as posts and notches or posts and socket arrangements. Under a scenario where a rear seat elevating gas spring rear strut is not utilized then rear wheels will be attached directly to the rear ends of the cross bar mechanism, and the child seats will remain at the same height in both side-by-side and tandem configurations.

FIG. 7 shows an embodiment of a stroller of the present disclosure in a collapsed state convenient for transport or storage. To fully collapse the stroller the user needs to complete the following steps:

Place the stroller into the tandem configuration.
Remove the seats from the seat plates. This is done by releasing the seat plate locking mechanism that holds seats in place.
Release the locking switch mechanism (located on each of the two handlebars) to permit a full collapsing of the cross-bar frame assembly. In this position the cross bars are fully collapsed so that they are adjacent and flush to each other.
Release the lock for the rear gas-spring elevating bars and flip the rear wheels so that they are adjacent to and flush with the collapsed cross-bars of the convertible frame assembly.
Unlock the handles and fold them forward so that they are adjacent to and flush with the collapsed cross bars of the convertible frame assembly.
Once the stroller base frame assembly is fully collapsed it is highly compact and can easily fit into storage locations such as trunks, rear seats, closets, public transit, etc.

Although the invention has been described with reference to certain preferred embodiments, it will be appreciated by those skilled in the art that modifications and variations may be made without departing from the spirit and scope of the invention. It should be understood that applicant does not intend to be limited to the particular details described above and illustrated in the accompanying drawings.

What is claimed is:

1. A convertible double stroller comprising:
   a pair of cross bars pivotally connected at a common vertex connected to a pair of telescoping rods creating a generally hour-glass shaped frame assembly having a front end and a rear end,
   a plurality of wheels attached to said frame assembly,
   at least one handle bar attached to said frame assembly rear end, and
   a pair of seat mounts fixedly attached to each of said telescoping rods, wherein said convertible double stroller may be selectively transitioned between three configurations including:
   (a) a first seated configuration wherein the frame assembly is in a fully expanded position thereby positioning the seat mounts in a side-by-side placement for seating;
   (b) a second seated configuration wherein the frame assembly is in an intermediately expanded position thereby positioning the seat mounts in a front-to-rear placement for seating; and
   (c) a storage configuration wherein the frame assembly is in a fully collapsed position for storage.

2. The convertible double stroller of claim 1 wherein each said crossbar is generally s-shaped.

3. The convertible double stroller of claim 1 wherein said telescoping rods are connected by pivoting hinges to said cross bars so that the telescoping rods remain parallel to each other irrespective of whether the frame assembly is in a seated or storage configuration.

4. The convertible double stroller of claim 1 wherein said plurality of wheels attached to said frame assembly includes a pivoting rear wheel.

5. The convertible double stroller of claim 4 wherein said pivoting rear wheel is equipped with a pivot locking mechanism to prevent the pivoting rear wheel from swiveling.

6. The convertible double stroller of claim 1 wherein said at least one handle bar is attached to said frame assembly with a pivoting locking hinge mechanism that allows for positioning of said at least one handle bar proximate said frame assembly for storage.

7. The convertible double stroller of claim 1 further comprising at least one carrying device removably affixed to at least one of said seat mounts, wherein said at least one carrying device is selected from the group consisting of a stroller seat, a car seat, a bassinette, a pet carrier, a cooler, a tub, and a basket.

8. The convertible double stroller of claim 7 wherein the stroller further comprises at least one stroller seat removably affixed to at least one of said pair of seat mounts.

9. The convertible double stroller of claim 1 wherein each of said seat mounts is respectively fixedly attached to a stationary subunit of each of said telescoping rods so that said seat mounts always face said front end irrespective of said configuration of said convertible double stroller.

10. A convertible double stroller comprising:
a pair of cross bars pivotally connected at a common vertex connected to a pair of telescoping rods creating a generally hour-glass shaped frame assembly having a front end and a rear end,
a plurality of wheels attached to said frame assembly,
at least one handle bar attached to said frame assembly rear end,
a means for selectively elevating said frame assembly rear end, and
a pair of seat mounts fixedly attached to each of said telescoping rods, wherein said convertible double stroller may be selectively transitioned between three configurations including:
(a) a first seated configuration wherein the frame assembly is in a fully expanded position thereby positioning the seat mounts in a side-by-side placement for seating;
(b) a second seated configuration wherein the frame assembly is in an intermediately expanded position thereby positioning the seat mounts in a front-to-rear placement for seating; and
(c) a storage configuration wherein the frame assembly is in a fully collapsed position for storage.

11. The convertible double stroller of claim 10 wherein said elevating means is a pair of extendable gas springs struts.

12. The convertible double stroller of claim 10 wherein each said crossbar is generally s-shaped.

13. The convertible double stroller of claim 10 wherein said telescoping rods are connected by pivoting hinges to said cross bars so that the telescoping rods remain parallel to each other irrespective of whether the frame assembly is in a seated or storage configuration.

14. The convertible double stroller of claim 10 wherein said plurality of wheels attached to said frame assembly includes a pivoting rear wheel.

15. The convertible double stroller of claim 14 wherein said pivoting rear wheel is equipped with a pivot locking mechanism to prevent the pivoting rear wheel from swiveling.

16. The convertible double stroller of claim 10 wherein said handle bar is attached to said frame assembly with a pivoting locking hinge mechanism that allows for positioning of said at least one handle bar proximate said frame assembly for storage.

17. The convertible double stroller of claim 10 wherein the stroller further comprises a pair of seats removably affixed to said pair of seat mounts.

18. The convertible double stroller of claim 10 further comprising at least one carrying device removably affixed to at least one of said seat mounts, wherein said at least one carrying device is selected from the group consisting of a stroller seat, a car seat, a bassinette, a pet carrier, a cooler, a tub, and a basket.

19. The convertible double stroller of claim 10 wherein each of said seat mounts is respectively fixedly attached to a stationary subunit of each of said telescoping rods so that said seat mounts always face said front end irrespective of said configuration of said convertible double stroller.

20. A convertible double stroller comprising:
a pair of generally s-shaped cross bars pivotally connected at a common vertex pivotally connected to a pair of telescoping rods creating a generally hour-glass shaped frame assembly having a front end and a rear end,
a plurality of wheels attached to said frame assembly wherein at least one wheel is a pivoting rear wheel,
a pivot locking mechanism to prevent said pivoting rear wheel from swiveling,
at least one collapsable handle bar attached to said frame assembly rear end,
a means for selectively elevating said frame assembly rear end,
a pair of seats removably attached to each of said telescoping rods, wherein said convertible double stroller may be selectively transitioned between three configurations including:
(a) a first seated configuration wherein the frame assembly is in a fully expanded position thereby positioning the seats in a side-by-side placement for seating;
(b) a second seated configuration wherein the frame assembly is in an intermediately expanded position thereby positioning the seats in a front-to-rear placement for seating; and
(c) a storage configuration wherein the frame assembly is in a fully collapsed position for storage.

* * * * *